Oct. 11, 1932.    C. W. KANOLT    1,882,646
PRODUCTION OF STEREOSCOPIC MOTION PICTURES
Filed July 26, 1929    5 Sheets-Sheet 1

Oct. 11, 1932. C. W. KANOLT 1,882,646
PRODUCTION OF STEREOSCOPIC MOTION PICTURES
Filed July 26, 1929 5 Sheets-Sheet 3

Inventor
Clarence W. Kanolt
By Vernon E. Hodge
His Attorney

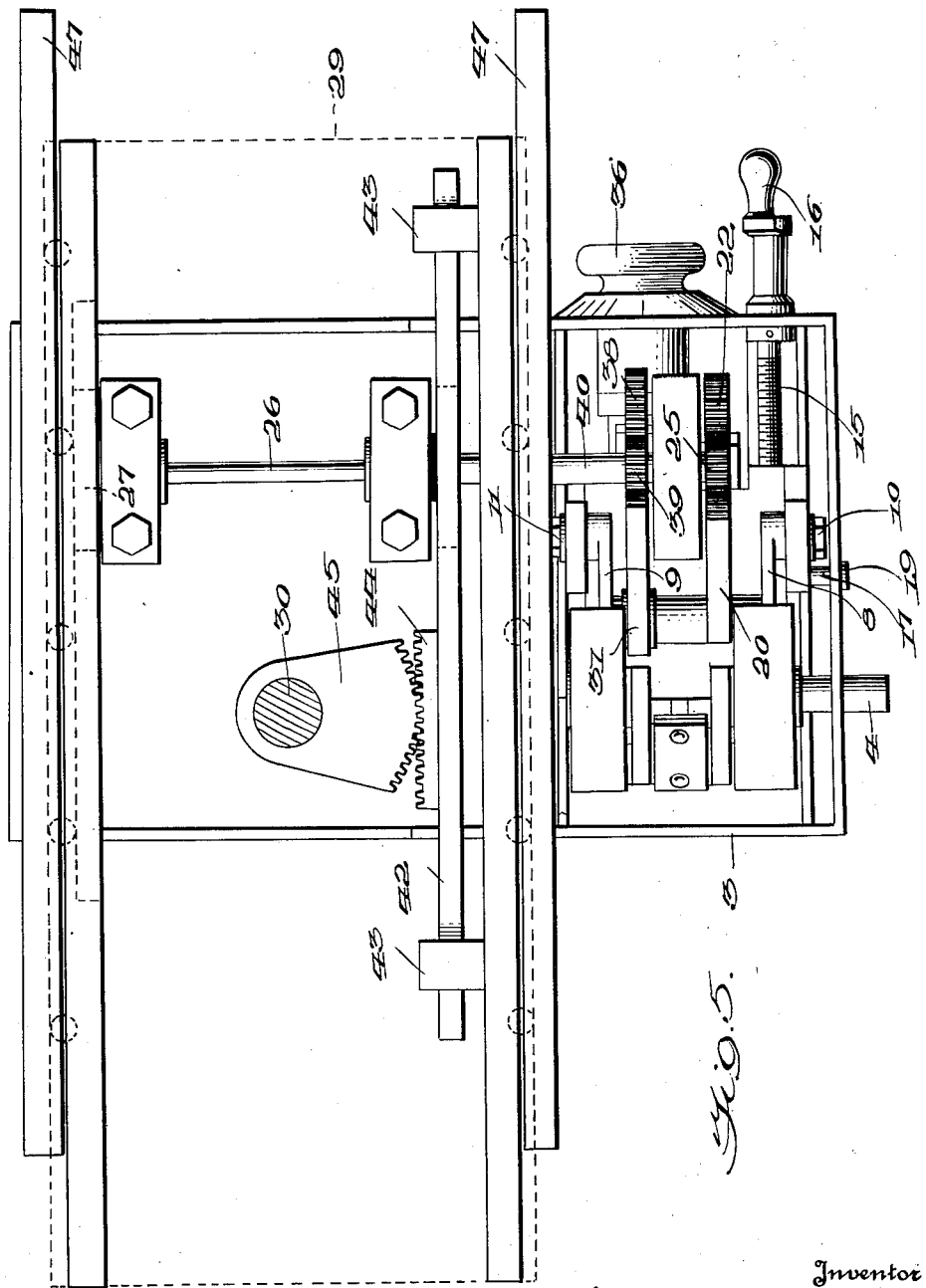

Oct. 11, 1932.  C. W. KANOLT  1,882,646
PRODUCTION OF STEREOSCOPIC MOTION PICTURES
Filed July 26, 1929   5 Sheets-Sheet 5

Inventor
Clarence W. Kanolt
By Vernon E. Hodges
His Attorney

Patented Oct. 11, 1932

1,882,646

UNITED STATES PATENT OFFICE

CLARENCE W. KANOLT, OF NEW YORK, N. Y.

PRODUCTION OF STEREOSCOPIC MOTION PICTURES

Application filed July 26, 1929. Serial No. 381,210.

This invention relates to an improvement in the production of stereoscopic motion pictures.

The ordinary motion pictures present only what may be termed a psychological stereoscopic effect, in which the familiarity of the observer with the size and shape of the objects viewed enables him to interpret in terms of distance and position the images formed on the retina, even when using only one eye in a stationary position. Similarly the distribution of light and shade on the objects, in conjunction with the long experience of the observer in viewing the distribution of light and shade, gives him information as to the shape and relative position of the object.

While some attempts have been made to produce stereoscopic effects in motion pictures, they have depended, for the most part, upon the viewing of the object by two eyes from slightly different positions, which therefore forms images on the two retinas which are not quite the same. Very slight differences enable the observer to judge unconsciously the relative positions of the objects. Such attempts have not led to practical useful results because either it has been necessary for each observer of the motion picture to hold some device before his eyes or else the pictures have appeared stereoscopic only when viewed from certain positions.

In my present invention, I employ another stereoscopic effect. When an observer is in motion relative to a set of objects, the images of these objects upon the retinas of his eyes move relative to each other, this motion being in general greater for the images of near objects than for the images of distant objects. This forms a source of stereoscopic effect which is absent when the observer is stationary relative to the objects. This particular kind of stereoscopic effect does not depend upon the two eyes of the observer, seeing different aspects of the objects. It can be obtained with one eye.

In order to obtain this stereoscopic effect, it is not necessary that the observer should move constantly in one direction; he may move back and forth or merely wag his head from side to side. A very small motion is sufficient to produce the stereoscopic effect if the objects observed are not too far distant. Since the effect depends upon relative motion of the objects and observer, it may be produced by moving the objects while the observer remains stationary.

In order to produce a stereoscopic effect in motion pictures, I propose to provide the motion picture camera, with which the pictures are made, with a mechanism by which it can be oscillated from side to side during its operation. If the pictures so made are projected upon a screen in the ordinary manner, they will present the appearance which an observer obtains when he wags his head from side to side while observing objects with one eye, and the pictures will therefore appear stereoscopic.

In the accompanying drawings:

Fig. 5 is a horizontal sectional view through the box;

Fig. 6 is a similar view at a lower point; and

The numeral 1 designates the camera, which may be of the usual type employed for taking motion pictures. The mechanism of the camera is operated in the usual way by rotating the shaft 2 either by a crank turned by hand or, preferably, by an electric motor, such as is frequently used on motion picture cameras.

Figure 4:
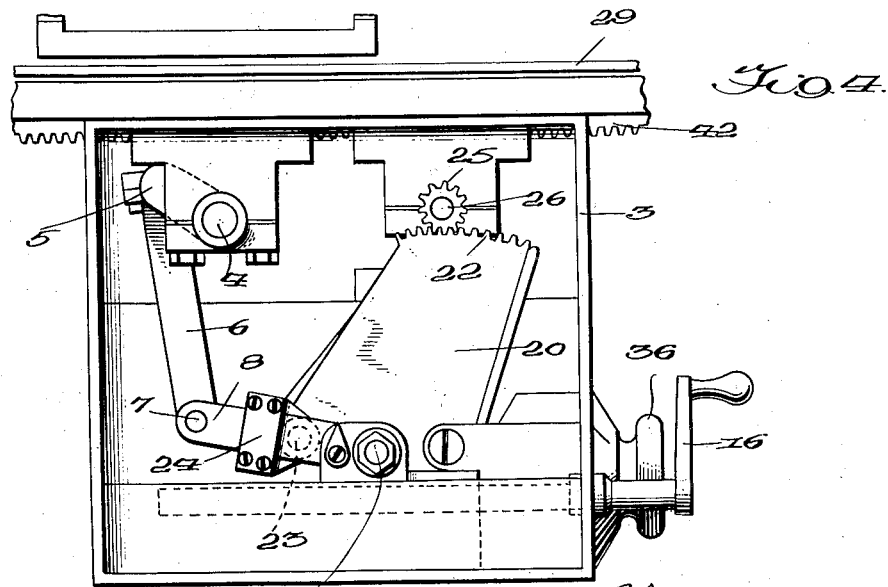
Fig. 4 is a sectional view therethrough.

Mounted within a casing or box 3 is a shaft 4 (see Figs. 4, 5 and 7), which may be rotated by a crank turned by hand or by an electric driving device of variable speed. The shaft 4 has a crank 5 formed therein, on which is mounted one end of a connecting rod 6, the opposite end of which is pivotally connected with the cross rod 7 extending between the levers 8 and 9.

Figure 2:
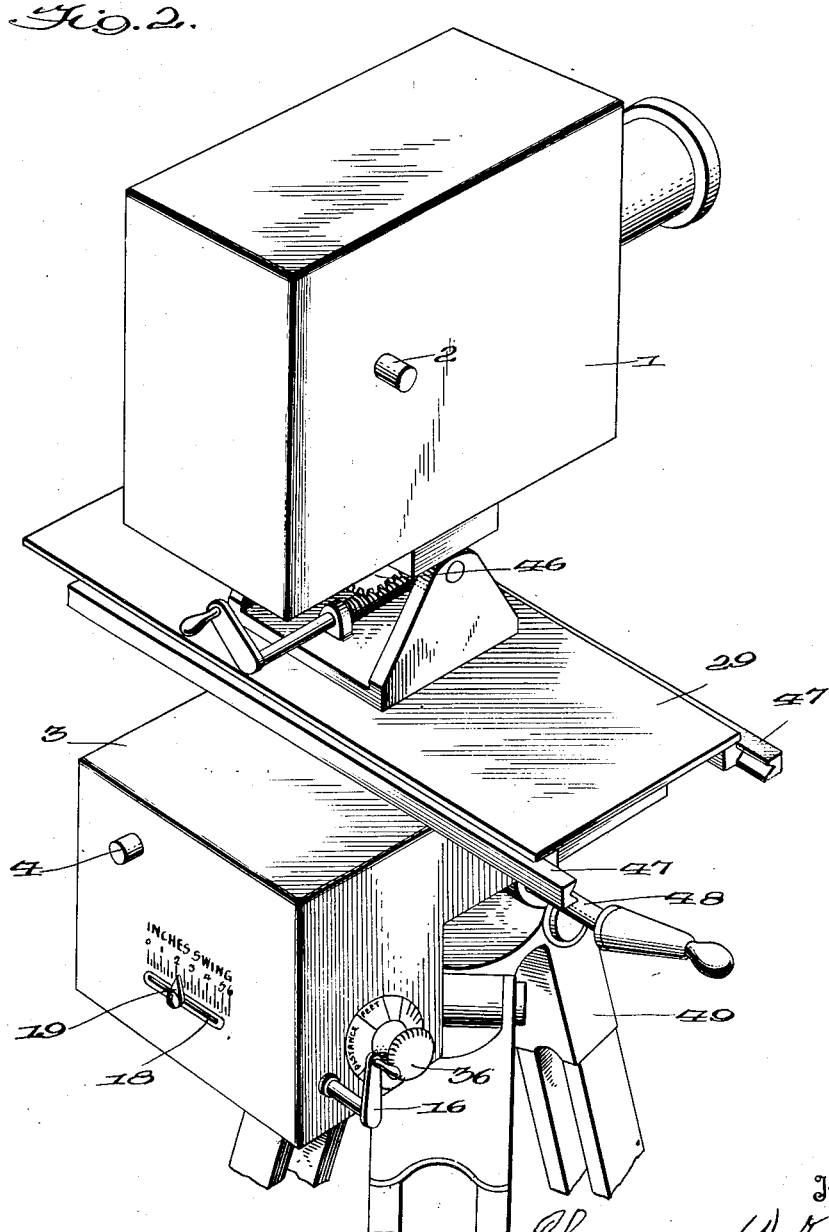
Fig. 2 is a perspective view of the complete mechanism.
Figure 3:
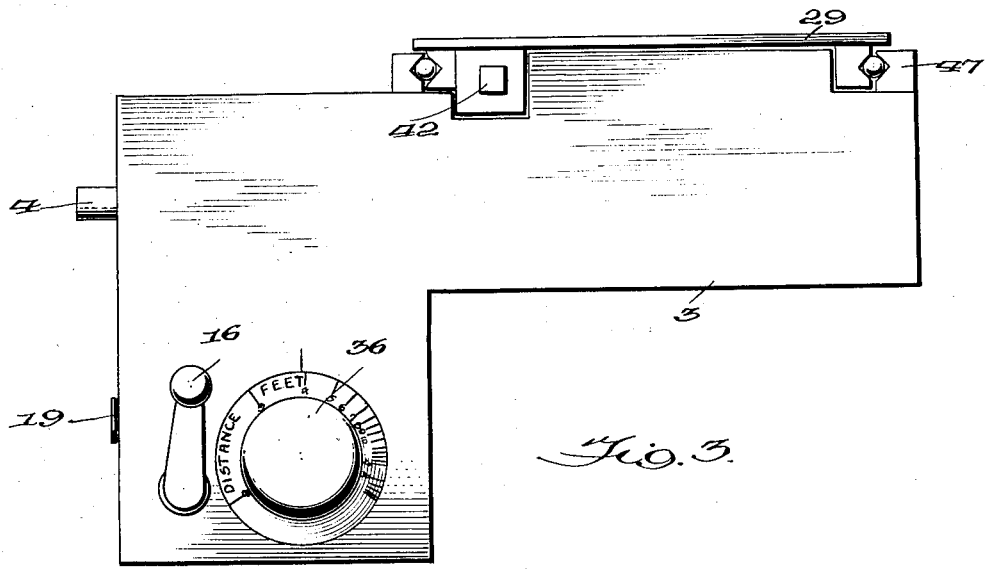
Fig. 3 is a side elevation of the box for the mechanism.
Figure 7:
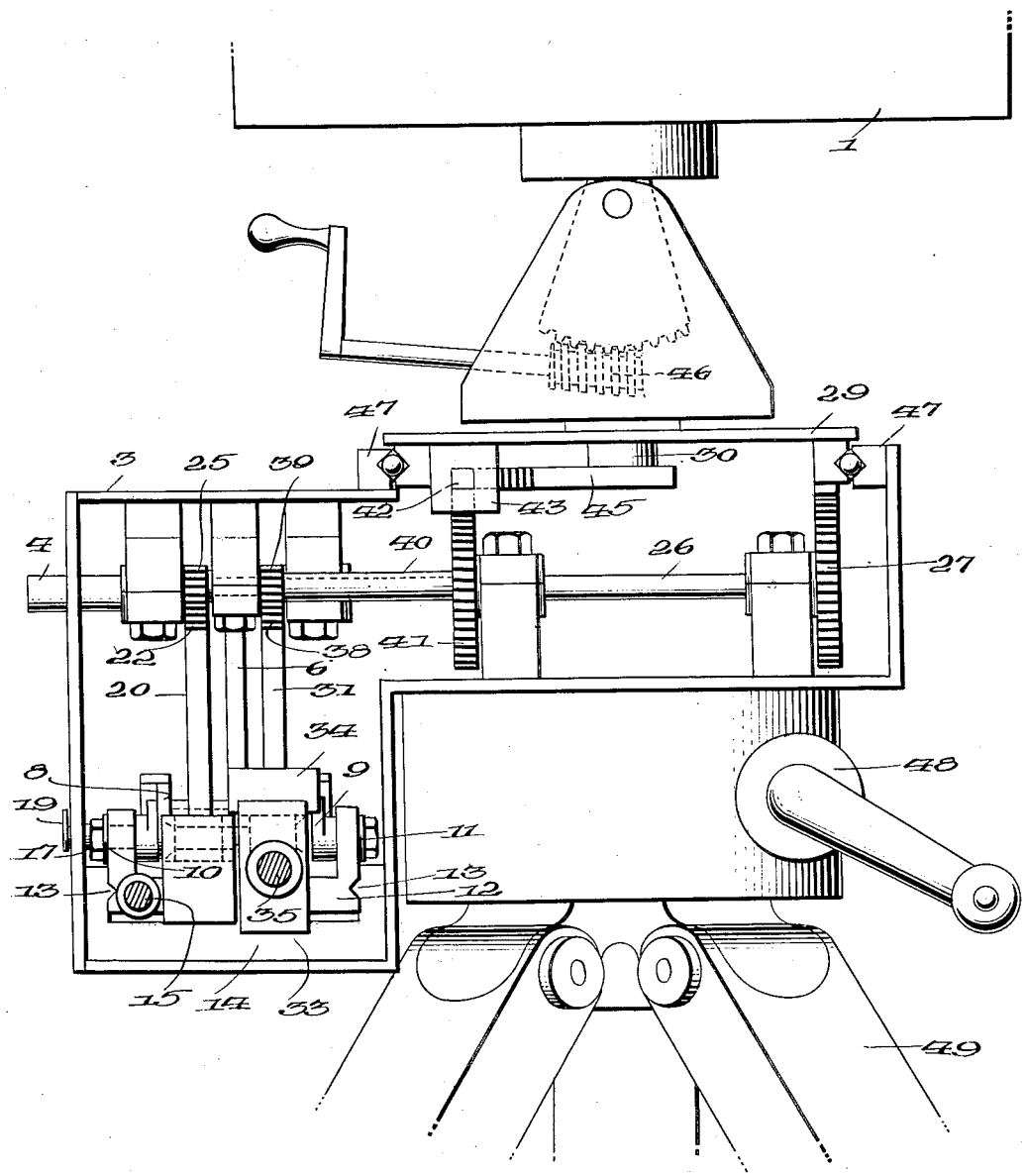
Fig. 7 is a transverse sectional view partly in side elevation.

These levers 8 and 9 are pivotally connected through the bearings 10 and 11, with a carriage 12. As shown in Fig. 7, the carriage 12 is slidably mounted on the tracks 13 for longitudinal adjustment, these tracks being carried by the fixed bed 14. A screw 15 (see Figs. 5, 6 and 7) is journaled in the box 3 and is threaded into a portion of the carriage 12, and outside of the box it has a handle 16 for turning the same. The turning of this screw 15 adjusts the carriage 12 longitudinally of the tracks 13. As a means of guiding this adjustment of the carriage 12 to the position required to give the desired amplitude of motion, the carriage carries an extension arm 17 extending through a slot 18 in the side of the box 3, on which a pointer 19 is supported, which indicates the adjustment of the carriage on a scale on the side of the box 3, as shown in Fig. 2.

A rocker 20 has a fixed pivot 21 and is provided with gear teeth 22 on its periphery, which have the bearing 21 as a center. Extending through the rocker 20 is a cross arm 23, the opposite ends of which are connected with guides 24 slidably mounted on the levers 8 and 9. The oscillatory motion of the levers 8 and 9 imparts to the cross arm 23 an oscillatory rotary motion, and the rocker 20 and the gear teeth 22 impart an oscillatory rotary motion to a gear 25, keyed on the shaft 26. The amplitude of this oscillatory motion is varied by the adjustment of the carriage 12 forward or backward.

The opposite end of the shaft 26 has a gear 27 fixed thereon, which meshes with a rack 28 fixed to the under-side of a plate 29. Mounted on and supported by this plate is the camera 1, it being supported by a shaft 30 rotatably mounted in the plate 29. The oscillatory rotary motion of the shaft 26 is transmitted to the gear 27, which causes the plate 29 and the camera carried thereby to oscillate laterally.

This mechanism described above would produce a variable lateral oscillation of the camera, but the camera will always point in the same azimuth. In order that during this motion it should always point approximately at some near object, it is necessary that as it oscillates laterally, it should have at the same time a slight oscillatory rotary motion.

To accomplish this, a second rocker 31 is pivotally supported as at 32 to a block 33, shown in Figs. 6 and 7, which is slidably mounted in a groove in the fixed bed 14 and in a corresponding groove in a fixed guide 34. A screw 35 journaled in the box 3 is threaded into the block 33 at one end and at its opposite end carries a head 36 on the outside of the box. This head carries a scale which indicates the position to which the head should be turned to cause the camera to point toward a point at a given distance.

The rocker 31 has a slot 37 therein, through which the cross arm 23 extends. Gear teeth 38 are formed on the periphery of the rocker 31, which teeth have the bearing 32 as a center, and are of the same radius as the gear teeth 22. The oscillation of the cross arm 23 causes an oscillatory rotary motion of the rocker 31, which causes an oscillatory rotary motion of a gear 39 meshing with the teeth 38, which gear is of the same diameter as the gear 25. The gear 39 is fixed to a sleeve or hollow shaft 40, surrounding the shaft 26, and on which sleeve a gear 41 is fixed, this gear being of the same size as the gear 27. The gear 41 meshes with a rack 42, carried on the under-side of the carriage plate 29, but instead of being rigidly attached to this plate, as is the rack 28, the rack 42 is movable longitudinally relative to the carriage plate, being slidably mounted in supports 43 attached to the carriage. The rack 42 also carries side teeth 44 with which a gear segment 45 meshes, which segment is fixed to the shaft 30 on which the camera is supported.

If the movable bearing 32 is set at the same distance from the cross arm 23 as the fixed bearing 21, the motion imparted by the cross arm 23 to the rocker 31 will be identical with that imparted to the rocker 20. The motion of the rack 42 will then be identical with the motion of the rack 28, which is rigidly attached to the carriage plate 29. Consequently the rack 42 will not move relative to the carriage plate and no rotary motion will be given to the camera. This condition is suitable for making pictures of objects at a great distance.

Figure 1:
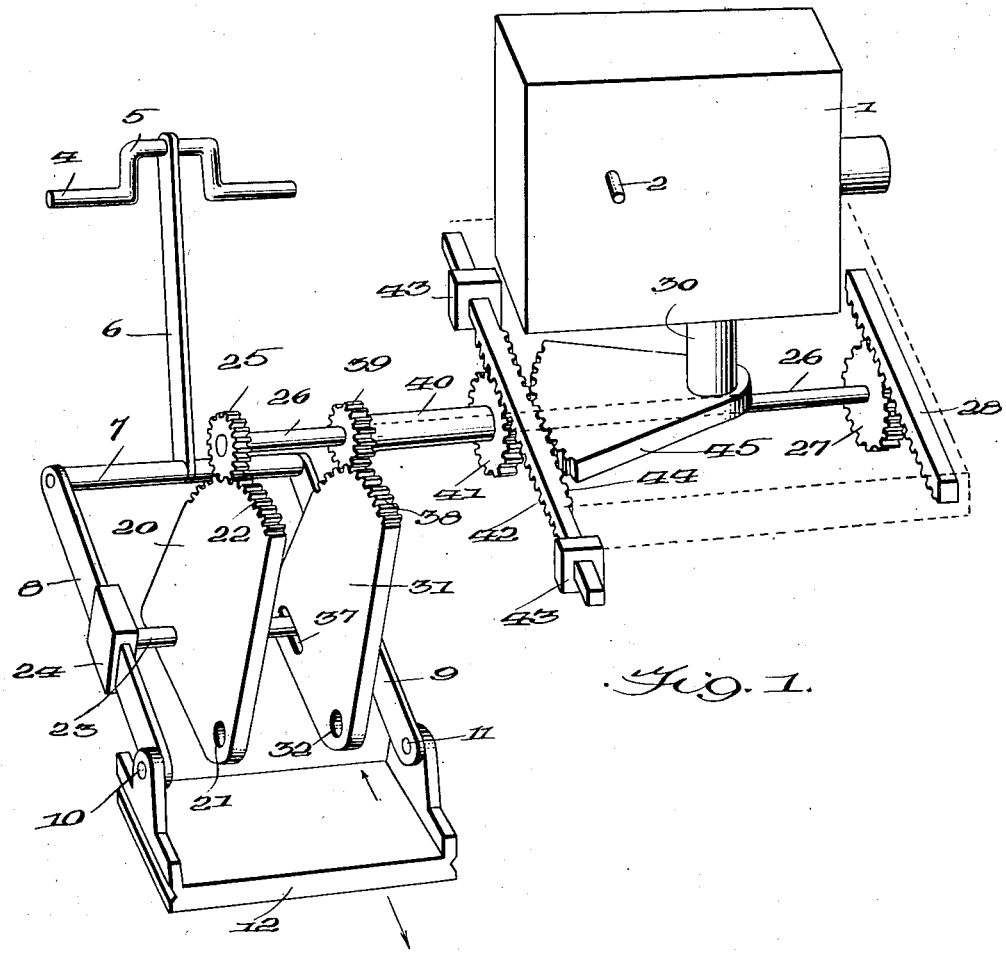
Fig. 1 is a diagrammatic perspective view of the important parts of the mechanism.

If the movable bearing 32 is moved slightly in the direction of the arrow in Fig. 1, the amplitude of motion imparted to the rocker 31 will be slightly greater than that imparted to the rocker 20, and consequently the amplitude of motion of the rack 42 will be slightly greater to a corresponding extent than that of the rack 28. Thus the rack 42 will move slightly relative to the carriage plate 29 and the camera will be given a rotary motion, such that during its lateral oscillation, it will remain pointed approximately at a fixed point.

The rate or speed of oscillation of the camera will have an influence on the impression the motion pictures obtained present when they are viewed. It may be desirable to employ different rates of oscillation in different cases or to vary the rate during the oscillation of the camera.

The oscillating mechanism may be driven by hand by means of a handle attached to the end of the shaft 4 but the camera must be operated at the same time by turning the shaft 2. Consequently, it would usually be more convenient to drive one or preferably both of the shafts 2 and 4 by means of small electric motors of variable speed, which electric driving devices are frequently used on motion picture cameras.

In either event, the rate of oscillation during the operation of the device may be varied. If desired, speed reducing gearing may be placed in the box 3 with the high speed part of the gearing attached to a motor and the low speed part attached to the shaft 4.

As shown in Figs. 2 and 7, the camera 1 may be mounted on a worm gear tilting device 46, which is attached to the carriage plate 29 in the usual manner. This carriage plate may be mounted on ball bearing supports, designated generally by the numeral 47 in Fig. 7, by which it is attached to the top of the box 3. This box is carried on the worm gear rotating device 48 for adjusting the azimuth of the camera. This rotating device 48 is of the usual construction and is mounted on the top of a tripod 49. The devices 46 and 48 are commonly employed in motion picture cameras and need not be described in detail.

While modifications might be made in the mechanism of oscillating the camera from side to side during its operation without departing from the spirit of the invention, it is desirable at least when the camera is pointed at near objects that, while it is moved from side to side, it should always be kept turned toward the center of the group of objects.

The amplitude of the motion, which it is desirable to give the camera, will depend upon the distance of the objects photographed, being in general less for near objects than for distant objects. It is desirable that the mechanism should be such that this amplitude can be varied and that this variation can be accomplished without stopping the operation of the camera. Also the mechanism that causes the camera to point always toward the center of the group of objects being photographed should be capable of adjustment for objects of different distances, and it is desirable that this adjustment also can be accomplished without stopping the operation of the camera.

While the mechanism described in connection with this invention produces an oscillatory motion of the camera, yet a similar result may be obtained by keeping the camera stationary but giving the entire group of objects being photographed a slight oscillatory rotary motion about a vertical axis near the center of the group, or a slight lateral oscillatory motion. This can be accomplished in some cases by placing the group of objects on a turn-table and operating it suitably.

I claim:—

1. In mechanism for producing stereoscopic motion pictures, the combination with a motion picture camera, of supporting means therefor mounted for sliding movement and permitting relative turning movement of the camera, means for causing said sliding movement, separate means for causing said turning movement, a carriage slidably mounted and connected with both of said last-mentioned means, and means for adjusting said carriage for adjusting the amplitude of the motion of the camera.

2. In mechanism for producing stereoscopic motion pictures, the combination with a motion picture camera, of a supporting plate therefor mounted for sliding movement and supporting the camera for relative turning movement, gearing for causing said sliding movement of the plate, separate gearing for causing said relative turning movement simultaneously with the sliding movement, a carriage operatively connected with said gearing, and means for adjusting the position of said carriage to vary the amplitude of the motion of the camera.

3. In mechanism for producing stereoscopic motion pictures, the combination with a motion picture camera, of a supporting plate therefor mounted for sliding movement, gearing for causing the sliding movement of the plate, separate gearing for causing relative turning movement of the camera, simultaneously with the sliding movement, rockers mounted for pivotal movement for respectively actuating said gearing, a carriage, operating means for the rockers operatively connected with the carriage, and means for adjusting the carriage for varying the amplitude of the motion for the camera.

4. In mechanism for producing stereoscopic motion pictures, the combination with a motion picture camera, of a supporting plate therefor mounted for sliding movement, gearing for causing the sliding movement of the plate, separate gearing for causing relative turning movement of the camera, simultaneously with the sliding movement, rockers mounted for pivotal movement for respectively actuating said gearing, a carriage, operating means for the rockers operatively connected with the carriage, means for adjusting the carriage for varying the amplitude of the motion of the camera, and means for adjusting the pivotal support of at least one of the rockers for adjusting the turning of the camera toward the objects.

5. In mechanism for producing stereoscopic motion pictures, the combination with a motion picture camera, of a plate mounted for sliding movement and supporting the camera for relative turning movement, a rack fixed to said plate, a rack slidably mounted relative to the plate, means operatively connected with the last-mentioned rack for causing relative turning movement of the camera upon relative actuation of the racks, gearing for actuating the racks at different speeds for causing sliding movement of the supporting plate and relative and simultaneous turning movement of the camera.

6. In mechanism for producing stereoscopic motion pictures, the combination with a motion picture camera, of supporting means therefor mounted for sliding movement and supporting the camera for relative turning movement, gearing for causing said sliding and turning movement, rockers mounted for pivotal movement and operatively connected with the gearing, means for actuating said rockers, a carriage operatively connected with said actuating means, and means for adjusting the position of the carriage to vary the amplitude of the motion of the camera.

7. In mechanism for producing stereoscopic motion pictures, the combination with a motion picture camera, of supporting means therefor mounted for sliding movement and supporting the camera for relative turning movement, gearing for causing said sliding and turning movement, rockers mounted for pivotal movement and operatively connected with the gearing, means for actuating said rockers, a carriage operatively connected with said actuating means, means for adjusting the position of the carriage to vary the amplitude of the motion of the camera, and means for adjusting the pivotal support for one of the rockers to vary the turning of the camera toward the objects.

8. In mechanism for producing stereoscopic motion pictures, the combination with a motion picture camera, of supporting means therefor mounted for sliding movement and supporting the camera for relative turning movement, gearing for causing said sliding and turning movement, pivotally mounted rockers for respectively actuating said gearing, a fixed pivot for one of said rockers, a movable pivot for the other rocker, and means for adjusting said movable pivot.

9. In mechanism for producing stereoscopic motion pictures, the combination with a motion picture camera, of supporting means therefor mounted for sliding movement and supporting the camera for relative turning movement, gearing for causing said sliding and turning movement, pivotally mounted rockers for respectively actuating said gearing, a fixed pivot for one of said rockers, a movable pivot for the other rocker, and means for adjusting said movable pivot, a slidably mounted carriage, levers pivoted to said carriage, a cross arm connected with the levers and with the rockers, means for actuating the levers, and means for slidably adjusting the carriage to vary the amplitude of the motion of the camera.

10. In mechanism for producing stereoscopic pictures, the combination of a camera, a rocker for causing a movement of the camera in a path relative to an object, a second rocker for causing a turning of the camera relative to said path of movement and simultaneous therewith, and means for shifting the position of the second rocker relative to the first rocker to vary the amplitude of motion of the camera.

11. In mechanism for producing stereoscopic pictures, the combination of a camera, a rocker for causing a movement of the camera in a path relative to an object, a second rocker for causing a turning of the camera relative to said path of movement and simultaneous therewith, means for transmitting the respective movements of the rockers to the camera, actuating means for the rockers, and means for shifting the position of the second rocker relative to the first rocker to vary the amplitude of motion of the camera.

12. In mechanism for producing stereoscopic pictures, the combination of a camera, a rocker, means for operatively connecting the rocker with the camera, a pivotal support for the rocker, a carriage, means for adjusting the position of the carriage, and actuating means for the rocker connected with the carriage.

13. In mechanism for producing stereoscopic pictures, the combination of a camera, a rocker, means for operatively connecting the rocker with the camera to move the camera relative to an object, a pivotal support for the rocker, a carriage, means for adjusting the position of the carriage, and actuating means for the rocker pivoted to the carriage.

14. In mechanism for producing stereoscopic pictures, the combination of a camera, a rocker, means for operatively connecting the rocker with the camera to move the camera in a path relative to an object, a pivotal support for the rocker, a carriage, means for slidably adjusting the position of the carriage, and means pivoted to said carriage for actuating the rocker.

15. In mechanism for producing stereoscopic pictures, the combination with a camera, of a rocker, means for operatively connecting the rocker with the camera, a pivotal support for the rocker, a carriage, means for adjusting the carriage to different positions, and means pivotally supported by the carriage for actuating the rocker.

16. In mechanism for producing stereoscopic pictures, the combination with a camera, and a carriage therefor, of a rocker, means operatively connecting the rocker with the camera, a pivotal support for the rocker, a second carriage, means for adjusting said second carriage to different positions, and means for actuating the rocker.

17. In mechanism for producing stereoscopic pictures, the combination with a camera, gearing for causing sliding movement of the camera, separate gearing for causing relative turning movement of the camera, rockers for respectively actuating said gearing, a support, operating means for the rockers operatively connected with the support, and means for adjusting the support for varying the amplitude of motion of the camera.

In testimony whereof I affix my signature.

CLARENCE W. KANOLT.